UNITED STATES PATENT OFFICE.

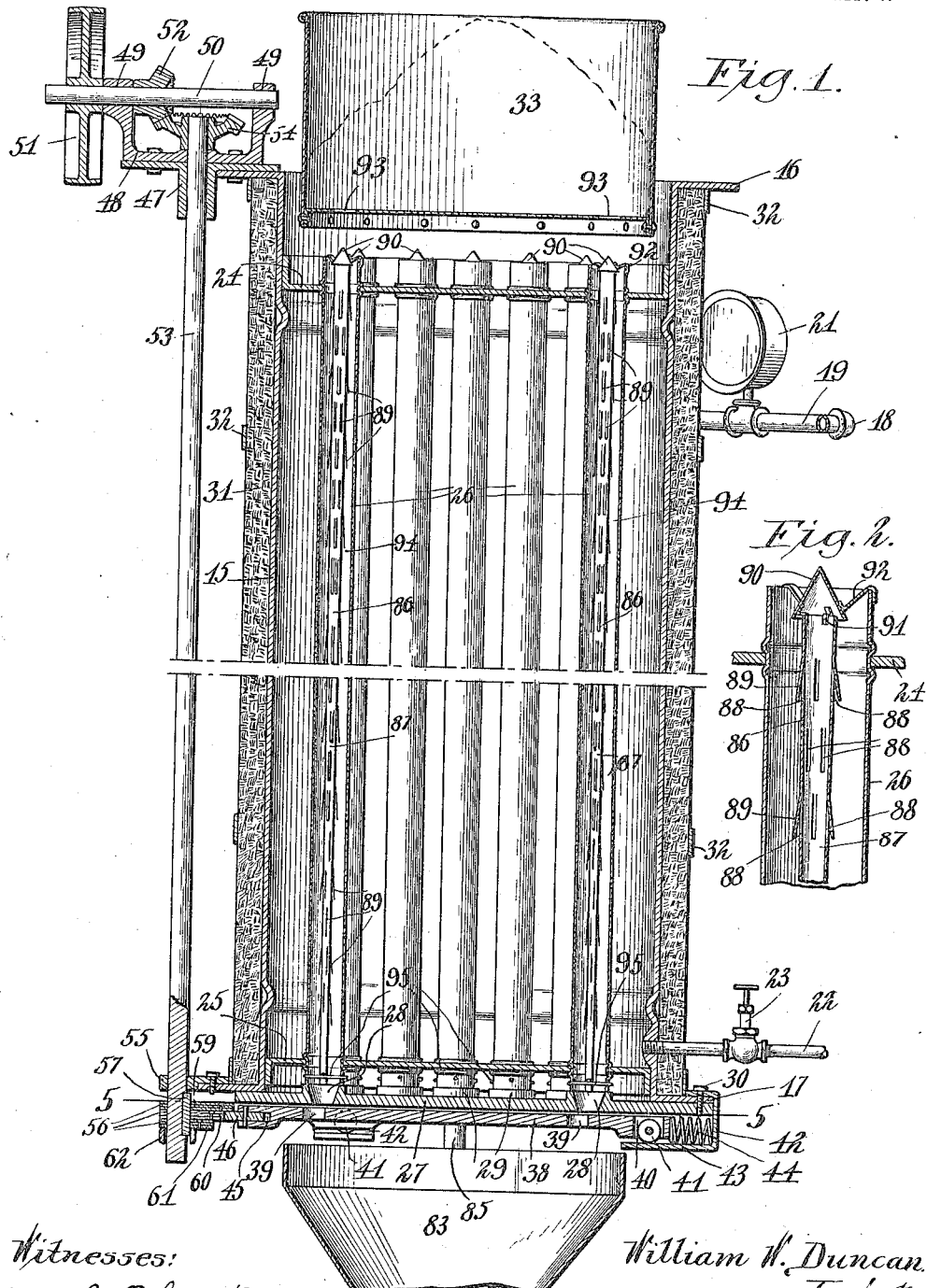

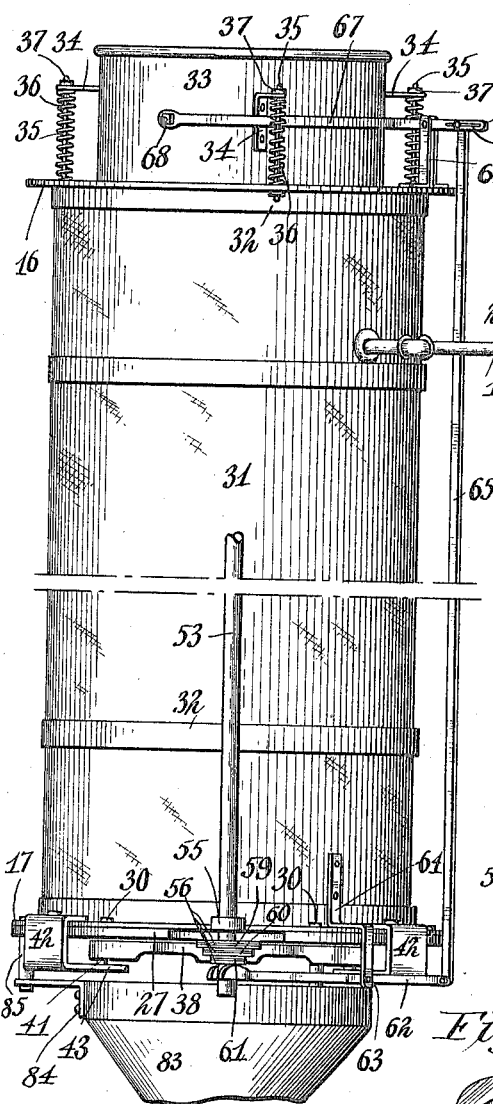
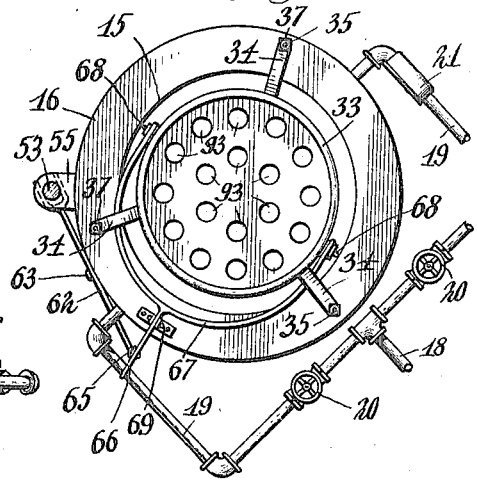
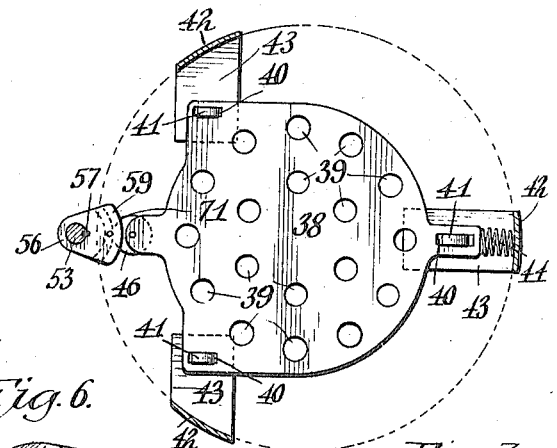
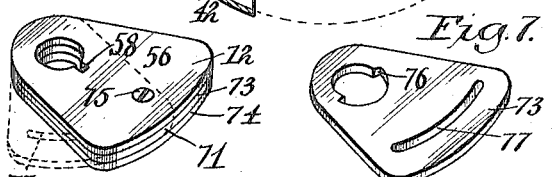

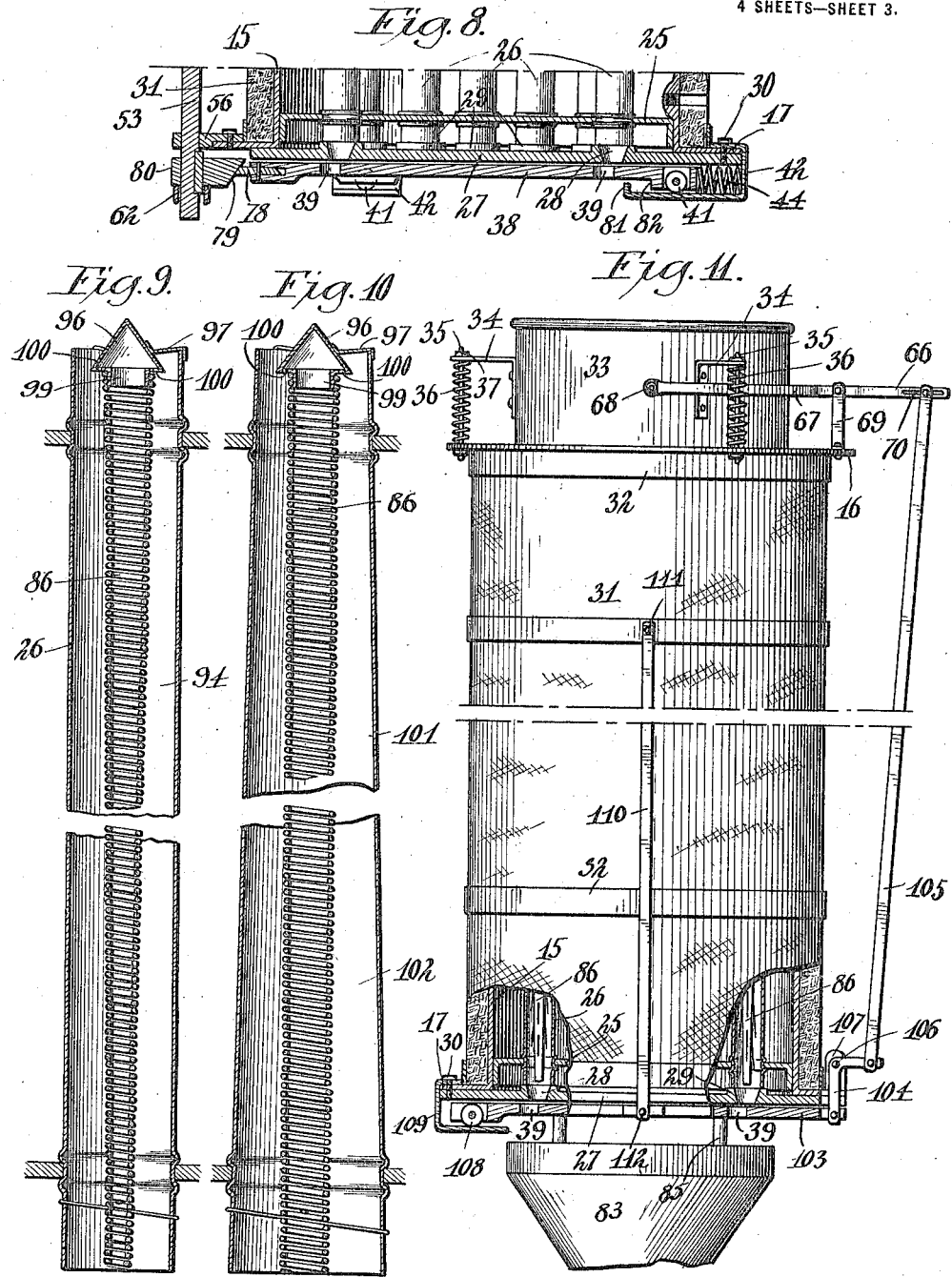

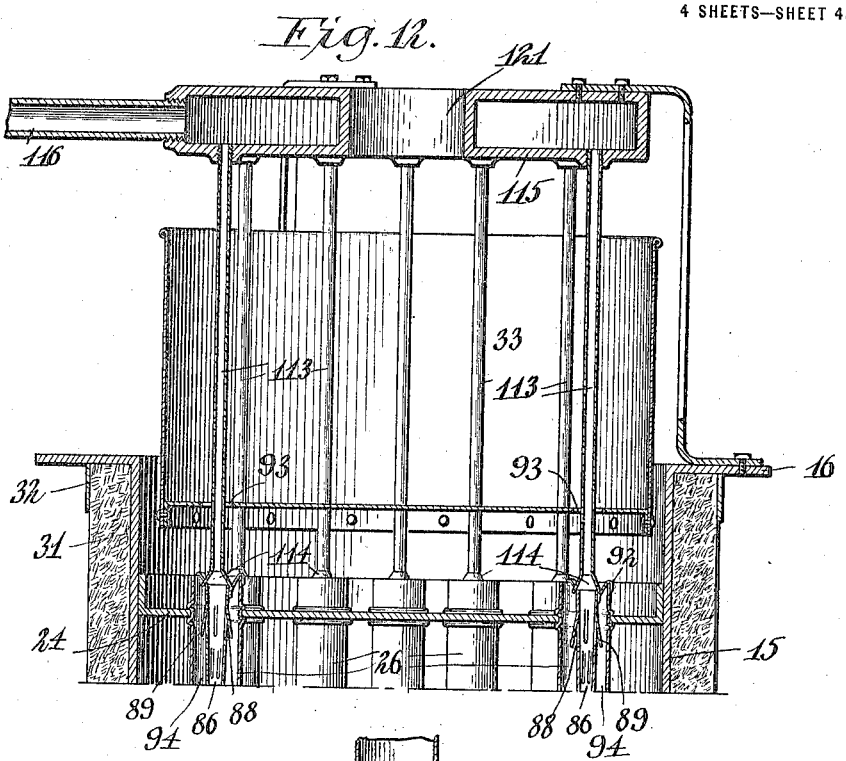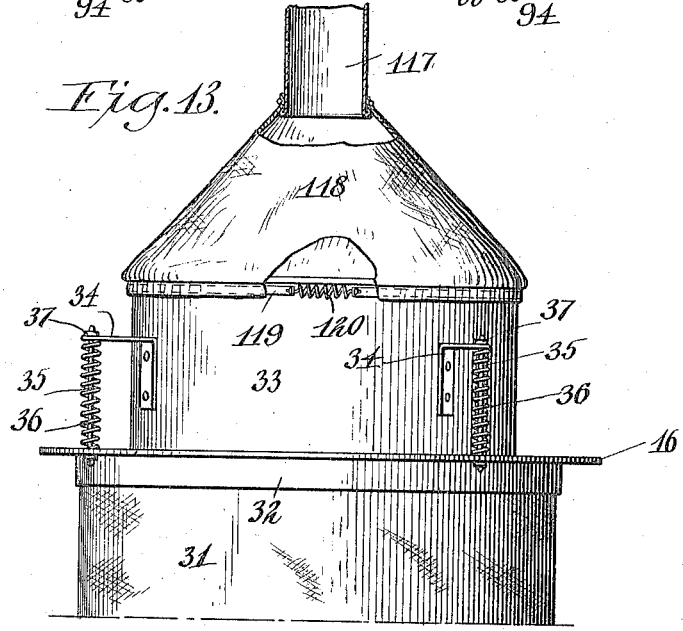

WILLIAM W. DUNCAN, OF TORONTO, ONTARIO, CANADA, ASSIGNOR TO MARY E. WEGNER, OF BUFFALO, NEW YORK.

GRAIN CONDITIONER AND DRIER.

1,181,121. Specification of Letters Patent. Patented May 2, 1916.

Application filed May 6, 1912. Serial No. 695,404.

*To all whom it may concern:*

Be it known that I, WILLIAM W. DUNCAN, a subject of the King of Great Britain, and resident of Toronto, in the county of York and Province of Ontario, Dominion of Canada, have invented certain new and useful Improvements in Grain Conditioners and Driers, of which the following is a specification.

My invention relates to new and useful improvements in grain conditioners and driers, and it has for its primary object the provision of automatically-controlled means for regulating the passage of grain through the apparatus.

Another object of my invention is the provision of means whereby the grain or other material being dried is subjected to an even distribution of heat in its passage through the apparatus.

Another object is to regulate the passage of grain or other material in its passage through the apparatus and thus control the period of time to which the grain must be subjected to the heat.

A further object is to control the discharge of grain or other material from the apparatus by means of a receptacle or basket movable under weight of the grain or other material deposited in it for feeding into the apparatus, which weight serves as a medium to regulate the discharge of the grain, thus controlling the feeding of the grain in proportion to the discharge.

Still further objects are to prevent the clogging of the material as it passes through the apparatus; to provide means for keeping the apparatus full at all times, thus preventing an overflow and also the emptying of the apparatus; and to otherwise improve on conditioners and driers now in use.

With these objects in view, the invention consists in the novel features of construction and in the arrangement and combination of parts to be hereinafter described and particularly pointed out in the subjoined claims.

In the drawings,—Figure 1 is a central vertical broken section of a conditioner and drier embodying my invention in what I now consider the preferred construction. Fig. 2 is an enlarged vertical section through the upper end of one of the grain tubes. Fig. 3 is a broken side elevation of the apparatus showing the driving mechanism and a portion of the driven shaft omitted to better illustrate parts in rear of the same. Fig. 4 is a plan view with the driving mechanism omitted and the driven shaft shown in section. Fig. 5 is a horizontal section taken on line 5—5, Fig. 1. Fig. 6 is a detached perspective view of one of the extensible cams. Fig. 7 is a detached perspective view of one of the sections of the cams. Fig. 8 is a vertical section showing modified means for operating the regulating discharge-disk or plate. Fig. 9 is an enlarged broken vertical section of a modified form of grain tube. Fig. 10 is a similar section of a still further modified form of grain tube. Fig. 11 is a side elevation partly in section of an apparatus equipped with a modified form of mechanism for actuating the grain regulating discharge-disk or plate. Fig. 12 is a vertical section of the upper end of the apparatus showing means for exhausting moisture associated therewith, the driving mechanism being omitted therefrom. Fig. 13 is an elevation of the upper end of the apparatus showing part thereof broken away and the apparatus equipped with a dust-guard.

Referring now to the drawings in detail, similar numerals of reference refer to similar parts throughout the several figures.

The apparatus comprises a casing 15 which is preferably cylindrical and provided with a flange 16 at its upper end and a similar flange 17 at its lower end. This casing is advisedly constructed of boiler iron so as to withstand the pressure of steam which is directed into it through an inlet pipe 18, said pipe having two branches 19, which enter the casing and each of said branches having a valve 20 to control the passage of steam through it. One of said branches is equipped with a pressure gage 21 to determine the pressure to which the casing is subjected. It is therefore plain that the branch having the pressure gage is the one always in use and that when additional steam is required, the branch without a pressure gage may be opened to supply the additional steam required. At the lower end of the casing is an exhaust pipe 22 for the exhaust of the water of condensation, said exhaust pipe being equipped with a hand valve 23.

At or near each end of the cylindrical casing the usual heads 24, 25 are provided, these heads being welded or otherwise secured to the cylindrical wall of the casing and they have alined openings therein for the reception of opposite ends of tubes 26, which may be termed "grain-tubes," since through them is passed the grain fed into the apparatus. These tubes extend above the upper head and beneath the lower head, as clearly shown in Fig. 1.

Secured to the lower end of the casing is a plate 27 which has openings 28 in it in line with the grain tubes, said openings being preferably tapered downward and having on the upper face of the plate surrounding flanges 29 in contact with which or directly above which, as may be desired, the lower ends of the grain tubes terminate. The means I preferably employ for securing the plate 27 to the casing is plainly shown in Fig. 1, in which screw bolts 30 pass through the flange 17 at the lower edge of the casing and take into the plate 27, but any other fastening means may be employed, if desired. The casing is preferably faced with a layer of asbestos 31 around which hoops 32 are placed to retain the same in position.

Yieldingly supported from the upper flange 16 of the casing is a receiving chamber or hopper 33 which is provided with brackets 34 arranged equi-distantly therearound and through which pass rods 35 fastened to the upper flange 16 to guide the chamber or hopper in its movements. Around these rods are arranged spiral springs 36 bearing at one of their ends against the undersides on the brackets 34 and at their other ends against the upper face of the flange 16. Thus the chamber or hopper 33 is supported by the springs and when grain or other material is delivered thereinto, it lowers according to the tension of said springs, which may be regulated by nuts 37 threaded onto the upper ends of the rods 35, as clearly shown in Fig. 3.

Arranged beneath the plate 27 is a plate or disk 38 which has openings 39 therein spaced according to the arrangement of the grain tubes and the tapering openings in the plate 27, said openings 39 being preferably of a diameter corresponding to the small ends of the tapered openings 28 in plate 27. Said plate 38 may be termed a "cut-off" plate, since its function is to regulate the flow of the grain or other material from the grain tubes and it is designed to be moved in a straight line crosswise so that its openings may be brought into registration or out of registration with the openings 28 in plate 27; or by suitable adjusting mechanism, its openings may be moved partly into registration with said openings 28 so as to check the flow of grain passing through them. This cut-off plate is provided with slots 40 in which are rotatably held guide-rollers 41 and secured to the lower flange 17 of the casing 15 are brackets 42 extending downwardly therefrom and having rebent portions 43 which lie underneath the cut-off plate and in contact with which said rollers ride. Said rollers also bear against the under-face of plate 27 and for the purpose of retaining said cut-off plate in a position in which its openings are out of registration with those of the plate 27, an expansion spring 44 is interposed between one of the brackets 42 and the adjacent edge portion of said plate, as best shown in Figs. 1 and 5. At a point directly opposite the expansion spring 44 the cut-off disk is provided with a horizontal notch or pocket 45 and in said notch or pocket is rotatably held a contact-roller 46.

Secured to the upper flange 16 of the casing is a bracket 47 on which is secured a frame 48 having alined bearings 49 in which a driving shaft 50 is journaled, said shaft being arranged horizontally and having a belt pulley 51 secured thereto and a bevel-gear 52.

53 designates a driven or cam shaft which has one end journaled in the bracket 47 and frame 48 and to its upper extremity is secured a bevel-gear 54 which is in mesh with the bevel-gear 52 on the driving shaft 50. Said driven or cam shaft 53 has its lower end journaled in a bearing 55 secured to the lower flange 17 of the casing and rotatable with and slidable on said driven shaft is a series of cams 56, any one of which is adapted for coaction with the contact-roller 46 journaled in the cut-off plate. The cams of this series are arranged in stepped relation so that the extent of movement of the cut-off plate can be varied, said variation being brought about by the roller 46 engaging different cams of the series. In order to permit of lengthwise movement of the cams on the driven or cam shaft, said shaft is provided with a key 57 which loosely fits keyways 58 formed in each of the cams of the series, in the particular construction shown three cams 59, 60 and 61 comprise the series, but this number may be changed to suit the desires of the user. The stepped relation of the cams constituting the series is obtained by employing cams of different size or length, the cam 59 being largest, cam 61 the smallest, and the cam 60, which is herein shown as the intermediate cam, is of a size between the other two, but its stepped relation may be reversed, or the cams may be changed about so that the cam shown as the intermediate size may be either at the top or bottom. The series of cams are adjusted on the driven or cam shaft by means of a lever 62 having one end forked to straddle the shaft and bear against the underside of the series of cams to hold the same in position, said lever being pivotally secured between its ends, as at 63, to a bracket 64 secured to the casing or otherwise and having its opposite end pivotally connected with the lower end of a long link or rod 65 whose upper end is pivotally connected to a lever extension 66 of a bridle 67, the two arms of which latter pass on opposite sides of the chamber or hopper 33 and at diametrically opposite points are pivotally attached to said chamber or hopper, as at 68. This bridle is pivotally secured to a bracket 69 fastened to the upper flange 16 of the casing and its lever extension 66 has at its outer end a longitudinally-disposed slot 70 through which is passed the pivot which connects the extension of the bridle with the upper end of the long link or rod 65, said slot and pivot providing for an adjustment of movement of said link or rod obtained by shifting the pivot to different positions in said slot.

Provision is therefore made for regulating the movement of the link or rod 65 and through it the lever 62 so that the movement of the series of cams can be nicely controlled and assurance had of proper action of any individual cam of the series with the contact-roller 46. Each of the cams 59, 60, 61 has a curved contact portion 71 which has the axis of its shaft as a center and when the contact-roller 46 is in contact therewith, the cut-off plate 38 is momentarily held at rest, the length of time being in accordance with the velocity with which the cams rotate and being also controlled by the length of the concentric contact portions of the cams. It is of advantage to be able to change said periods of rest of the cut-off plate so as to allow more or less of the grain or other material to pass through the openings in said plate within a given period of time. For this purpose I have made each of said cams extensible, as best shown in Fig. 6, each cam is therefore formed in three sections, 72, 73 and 74, the two outer sections being held against movement relatively by the key 57 on the driven or cam shaft and by a clamping screw 75 which passes through one of the outer sections and is threaded into the other, while the intermediate section may be swung on said shaft so as to extend beyond the side edges of the two outer sections. To admit of this, said intermediate section has a segmental enlargement 76 at one side of its shaft opening and a segmental slot 77 with said shaft as its center, through which slot passes the clamping screw 75. When said clamping screw is tightened the sections of the cam may be held in any adjusted position and upon being loosened the intermediate section may be positioned as desired. The segmental enlargement 76 of the intermediate section provides the necessary clearance for the key of the shaft 53 on which the cams are keyed.

If desired, a beveled contact-roller 78 may be substituted for the roller 46, as clearly shown in Fig. 8, and in lieu of the series of cams above described, a single cam may be employed. Said cam has a portion of its edge beveled, as at 79, to correspond to the bevel of the contact-roller, and in order to prevent said contact-roller traveling in contact with the right-angled portion 80 of the edge of said cam the bracket 42 diametrically opposite has the extremity of its rebent portion bent upwardly, as at 81, to serve as a stop against which a depending portion 82 of the cut-off plate is adapted to strike. This eliminates, as near as possible, uneven wear of the contact-roller and at the same time permits the cut-off plate to be moved to fully closed position regardless of the vertically-adjusted position the cam may be in on its shaft.

Beneath the cut-off plate is arranged a receiving hopper 83 which is held in position by brackets 84 secured thereto, which in turn are fastened to studs 85 depending from the lower flange 17 of the casing.

With a view of providing for the escape of the moisture from the grain being dried within the grain tubes, by the steam within the casing and around the tubes, I provide within each grain tube what may be termed a "ventilator" 86. In preferred form this ventilator comprises a downwardly-tapering tube 87 open at opposite ends and having throughout its length a series of escape-openings 88 formed by cutting the metal from which the tube is formed into U-shape at regular intervals in its length and around the same and bending the lip 89 thus formed slightly outward so that they serve as shields for the escape-openings to prevent the entrance of grain into the grain-tube while allowing the escape of the moisture therefrom. The upper ends of these ventilator tubes are provided with cone shaped hoods 90, slightly larger than said tubes, but smaller than the grain tubes, so that grain may be fed into the grain tubes but cannot enter the ventilator tubes. These hoods are provided with inwardly-directed brackets 91 by means of which they are supported on the upper edge of ventilator tubes and they may also have outwardly-directed brackets 92 which engage the upper edge of the grain tubes, sufficient space being provided between the upper edge of the ventilator tubes and the inner surfaces of the hoods for the escape of the moisture from said tubes, which moisture may pass around the lower edges of the hoods and upwardly out of the casing.

In order to feed the grain into the grain tubes, the chamber or hopper 33 has openings 93 in its bottom which are arranged directly over the grain tubes and the hoods 90 at the upper ends of the ventilator tubes. By tapering the ventilator tubes downwardly, the annular space 94 formed between them and the walls of the grain tubes are gradually enlarged toward their lower ends, this being particularly desirable owing to the fact that as the grain or other material becomes gradually heated to a greater degree, it expands, consequently requires gradually larger space to pass through in order to prevent packing. This assures a free movement of the grain or other material through the grain tubes and as a further aid to prevent packing the uneven surface of the ventilator tube acts to slightly agitate the material in its downward course.

The ventilator tubes are held centrally within the grain tubes by the hoods at the upper ends thereof and at their lower ends; wires 95 may be passed through the grain tubes and the ventilator tubes to hold them centrally, or any other arrangement suitable for the purpose may be employed.

In Fig. 9 a modification of the ventilator tube is shown. In this modification the ventilator tube is formed of thin wire closely coiled and tapered downwardly, the spaces between the coils serving as escape-openings for the moisture. The wire surface of the ventilator tube also provides the necessary unevenness or undulations to agitate the fine particles of grain passing downward in contact therewith and by tapering the wire tubes or coils downwardly, the spaces intervening between them and the walls of the grain tubes are gradually enlarged downwardly, as in the construction shown in the preceding figures, thus allowing for the expansion of the material under the process of heating or drying and avoiding packing of the same within the grain tubes. Like the ventilator tube above described, the upper end of this ventilator tube is closed by a conical hood 96 held in central position by brackets 97 extending outwardly therefrom and engaging the upper edge of the grain tube. Each of these hoods has a spirally-grooved depending sleeve 99 on which the uppermost coils on the wire ventilator tube are threaded and this hood has openings 100 to permit the escape of the moisture entering it from the ventilator tubes.

If desired, the ventilator tube may be made of even diameter throughout its length, as shown in Fig. 10, and may be constructed of wire-coil, sheet-metal, or other suitable material. When, however, the ventilator tube is made cylindrical instead of tapered, I preferably employ upwardly tapering grain tubes 101 which provide intervening spaces 102 gradually enlarged downwardly so that the material passing through the grain tubes cannot become packed and will have a ready flow to the lower end.

The cut-off plate may be actuated otherwise than above described, and as one of the possible modifications to which this invention is susceptible, reference is now had to Fig. 11 in which the cut-off plate 103 has pivotally-connected thereto one end of a bell-crank lever 104, the other end of said bell-crank lever being pivotally connected to the lower end of a link or rod 105 which has its upper end connected to the extension 66 of the bridle 67, said bell-crank lever being pivotally secured at 106 to a bracket 107 fastened to the lower flange of the casing.

At a point diametrically opposite the connection of the bell-crank lever 104 with the cut-off plate, a supporting roller 108 is rotatably applied to the cut-off plate, which roller travels in contact with a bracket 109 secured to said lower flange of the casing. This roller supports the cut-off-plate, but in addition thereto I provide supporting links 110 which are arranged at opposite sides of the casing and have their upper ends secured to said casing, as at 111, and their lower ends to the cut-off plate at diametrically opposite points, as at 112.

The constantly changing position of the chamber or hopper 33 results in the actuation of the bridle 67 which in turn, through the actuation of the long link or rod 105, actuates the bell-crank lever and causes the latter to shift the cut-off plate so that the openings therein are moved into or out of registration with the openings in the plate 27, or at intermediate points, to regulate the flow of the material from the grain tubes.

If desired, the moisture may be drawn from the grain being dried by means of an exhaust system and where such a system is desirable, exhaust tubes 113 are provided which pass through the chamber or hopper 33, one tube passing down through each opening in the chamber or hopper and having its lower end flared, as at 114, to fit over the upper end of the ventilator tube. These tubes have their upper ends connected with a circular manifold 115 from which leads a suction tube 116 to a fan or other exhaust device (not shown).

Where the nature of the material or the surroundings require, arrangement may be made for inclosing the upper open end of the hopper, as shown in Fig. 13. In this figure 117 designates the discharge tube of a hopper, to the lower end of which is fastened a hood 118 of cloth or other material, preferably flexible, which has its lower marginal portion surrounding the upper end of the chamber or hopper 33. The lower end of the hood has a hoop 119 attached thereto with its ends connected by a retractile spring 120 which serves to hold the hoop with the material around it, clamped around the chamber or hopper 33. The material from the hopper tube 117 passes through the hood and enters the chamber or hopper 33 without the possibility of any foreign matter reaching it.

The operation is as follows:—The grain or other material is deposited or fed into the chamber or hopper 33 in any suitable manner, but preferably in a continuous stream and from the hopper it passes through the openings in the chamber and enters the upper ends of the grain tubes through which it slowly gravitates by reason of the openings in the plate 27 being opened intermittently, the opening of which is controlled by the series of cams on the cam shaft. The extent to which the openings in the plate 27 are opened are regulated by the engagement of any one of the series of cams with the contact-roller of the cut-off plate and the length of time the openings of the plate 27 are left open is regulated by the amount of the extension of the cam in contact with said roller. The engagement of the cams is controlled by the weight of the grain within the chamber or hopper 33, through the medium of the bridle 67 and rod and lever connections therewith leading to the cams.

In the modification shown in Fig. 11 the extent to which the openings in the plate 27 are opened is regulated by means of the bridle and its rod and lever connections with the cut-off plate, so that in this particular modification no driving mechanism will be necessary, as the cut-off plate is actuated directly from the hopper instead of by means of rotating cams positioned by the raising and lowering of the chamber or hopper.

Having thus described my invention, what I claim is,—

1. In an apparatus of the kind described, grain tubes subjected externally to heat having means arranged centrally therein for ventilating the same and intervening annular spaces between said ventilating means and the walls of said tubes which are gradually enlarged in the direction of the passage of grain through said tubes.

2. In an apparatus of the kind described, grain tubes subjected externally to heat, each provided with a ventilating tube having openings therein for the escape of moisture, each ventilating tube being open at its upper end and having means at said upper end to prevent the entrance of grain thereinto while permitting air to escape from said end.

3. In an apparatus of the kind described, grain tubes subjected externally to heat, each having a ventilating tube arranged centrally therein and extending from end to end thereof, said ventilating tube being open at its upper end and having a conical hood applied thereto, the base of said conical hood being separated from the upper end of the ventilating tube to provide a passage for the escape of moisture and being somewhat smaller than the internal diameter of said grain tube to allow the admission of grain into said grain tube.

4. In an apparatus of the kind described, grain tubes subjected externally to heat, each having a ventilating tube arranged centrally therein, said ventilating tube being tapered downwardly to provide a gradually enlarged space intervening said ventilating tube and the wall of said grain tube.

5. In an apparatus of the kind described, grain tubes subjected externally to heat, each having a ventilating tube arranged centrally therein, each ventilating tube having openings and integral lips shielding said openings and extending slightly outward from the surface of the ventilating tube.

6. In an apparatus of the kind described, grain tubes subjected externally to heat, each tube having a ventilating tube arranged centrally therein, each ventilating tube being tapered downwardly and having lips stamped therefrom to provide escape openings, said lips shielding said openings and being bulged outward out of line with the wall of said ventilating tube.

7. In an apparatus of the kind described, the combination with a casing having heads at opposite ends, of tubes arranged in said casing with their ends extending through said heads respectively, means for feeding grain into said tubes, and means for automatically regulating the flow of grain from said tubes.

8. In an apparatus of the kind described, the combination with a casing having tubes extending through opposite ends thereof, of means for feeding grain into said tubes, a cut-off plate having openings arranged to correspond with the positions of the tubes, and cam mechanism adapted to actuate said cut-off plate and being adjustable to control the extent of movement of said cut-off plate.

9. In an apparatus of the kind described, the combination with a casing, of grain tubes extending through the ends of said casing, a cut-off plate adapted to regulate the flow of grain from said tubes and also to cut off the flow thereof, a cam shaft, and a cam on said shaft engaging said cut-off plate to actuate the same.

10. In an apparatus of the kind described, the combination with a casing, of grain tubes extending through the ends thereof, means for feeding grain into said tubes, a cut-off plate having openings arranged to correspond with the arrangement of said tubes, a cam shaft, a cam secured to said cam shaft and engaging said cut-off plate to actuate the same, said cam being extensible to retain the cut-off plate in a certain position for longer or shorter periods of time.

11. In an apparatus of the kind described, the combination with a casing, of grain tubes extending through the ends thereof, means for feeding grain into said tubes, a cut-off plate beneath said tubes having openings spaced to correspond to the arrangement of said tubes, a cam shaft, and a series of stepped cams movable on said cam shaft, any one of the cams of said series being adapted to engage said cut-off plate to actuate the same.

12. In an apparatus of the kind described, the combination with a casing, of grain tubes extending therethrough and open at opposite ends, a hopper yieldingly supported above said grain tubes and having openings therein spaced to correspond with said grain tubes, a cut-off plate movable in a horizontal plane, a cam shaft, means for rotating said cam shaft, a cam rotatable with said cam shaft and lengthwise movable thereon, a lever pivotally connected between its ends and having one end in engagement with said cam to move the same lengthwise on said cam shaft, and connection between the opposite end of said lever and said yielding hopper.

13. In an apparatus of the kind described, the combination with a casing, of tubes arranged lengthwise in said casing and open at opposite ends, a grain feeding hopper above said tubes arranged to feed into the latter, springs yieldingly supporting said hopper to permit the same to move vertically under the weight of the grain therein, a bridle pivotally mounted and having pivotal connection with said hopper at diametrically opposite points, said bridle having a lever extension, a cut-off plate arranged for movement in a plane at an angle to the flow of grain through said grain tubes, a rotatable cam shaft, a cam rotatable with said cam shaft but lengthwise movable thereon, a lever pivotally secured between its ends and having one end in engagement with said cam to move the same lengthwise on said cam shaft, and a link pivotally connected at one end with the opposite end of said lever and having its other end pivotally connected to the lever extension of said bridle.

14. An apparatus of the kind described comprising a casing, grain tubes arranged within said casing and open at opposite ends to permit the passage of grain therethrough, ventilating and agitating means within each grain tube, for ventilating and agitating the material passing therethrough.

15. In an apparatus of the kind described, the combination with a casing having grain tubes, of a feed hopper above said grain tubes adapted to feed grain thereinto, a feed tube above said hopper, and a hood connecting said feed tube with the upper edge of said hopper to prevent the entrance of foreign matter into the hopper.

16. In an apparatus of the kind described, the combination with a casing having grain tubes, of a hopper yieldingly mounted above said grain tubes and adapted to feed grain thereinto, a feed tube arranged above said hopper, and a flexible hood connecting said feed tube with the upper edge of said hopper.

17. In an apparatus of the kind described, a casing having grain tubes therein, a cut-off plate beneath said grain tubes to regulate the flow of material from the latter, a cam shaft, and a cam on said shaft adapted to actuate said cut-off plate, said cam comprising three sections having concentric contact portions, one of said sections being movable independently of the other to extend the concentric contact portion of the cam and hold said cut-off plate in a certain position for longer periods.

In testimony whereof, I have affixed my signature in the presence of two subscribing witnesses.

WILLIAM W. DUNCAN.

Witnesses:
   Emil Neuhart,
   Jacob Oberst, Jr.

Copies of this patent may be obtained for five cents each, by addressing the "Commissioner of Patents, Washington, D. C."